Figure 1:
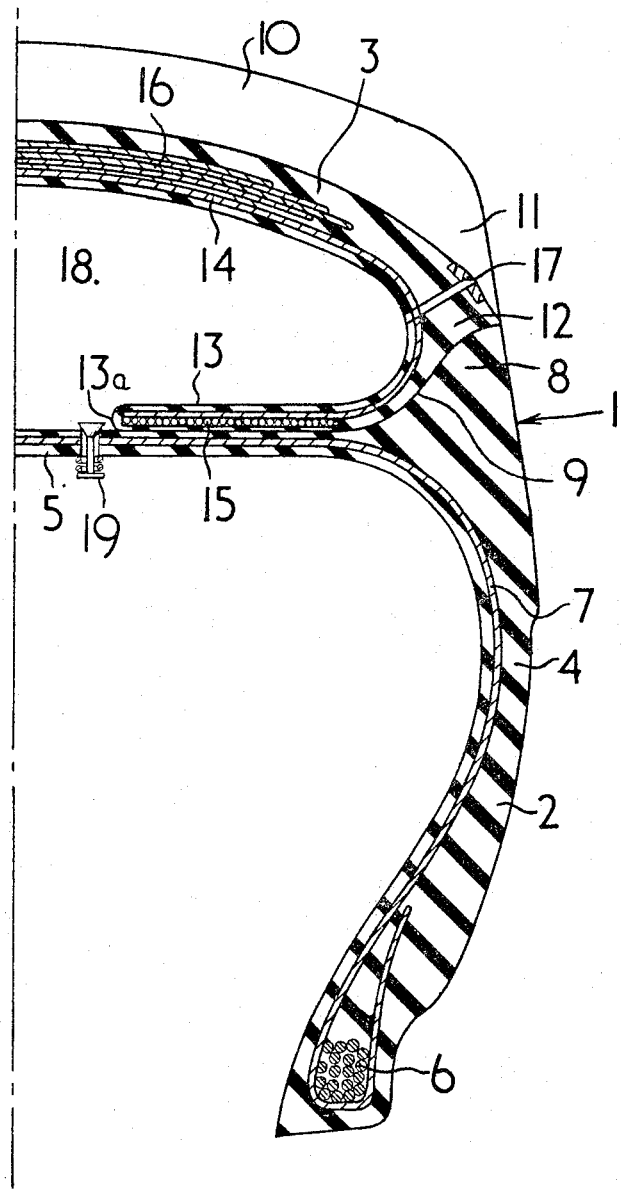

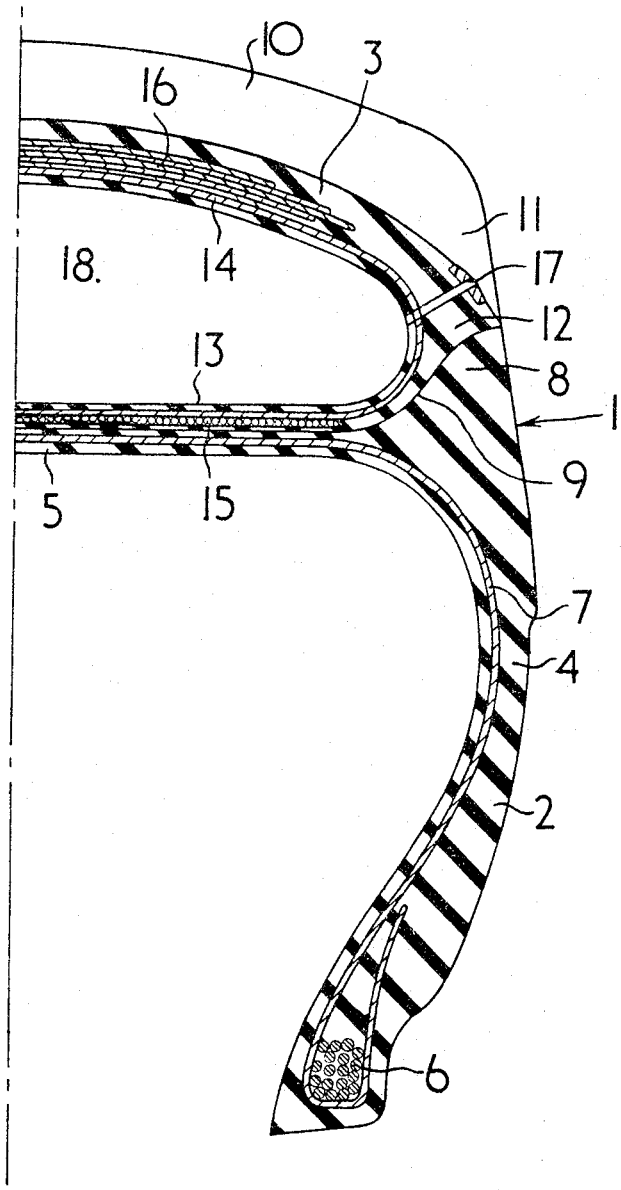

3,272,251
PNEUMATIC TIRE
Alfred Harry Grossett, Lichfield, England, assignor to Dunlop Rubber Company Limited, London, England, a British company
Filed Nov. 24, 1964, Ser. No. 413,578
Claims priority, application Great Britain, Dec. 14, 1963, 49,482/63
4 Claims. (Cl. 152—188)

This invention relates to pneumatic tires.

According to the invention, a pneumatic tire incorporating two sidewalls and a tread comprises an inflatable radially inner component and a detachable inflatable radially outer component, the radially inner component including at least a part of each sidewall of the tire and an annular bridging portion extending between and joined to said parts of the sidewalls, and the radially outer component including the tread portion of the tire and a base portion disposed radially inwardly of the tread portion, the base portion being substantially inextensible in a circumferential direction and being located about the annular bridging portion.

Preferably, the base portion comprises two axially spaced apart portions.

It is also preferable that the base portion is reinforced with at least one circumferentially extending cord to render the base portion inextensible in the circumferential direction.

Preferably, also, the part of the sidewall included in the radially inner component is reinforced with a layer of rubberized parallel cords which extend at an angle of substantially 90° to the mid-circumferential plane of the tire.

Preferably also means are provided for locating the radially outer component axially with respect to the radially inner component.

Embodiments of the invention are illustrated in FIGS. 1 and 2 of the accompanying drawings which show an axial cross section of one half of a pneumatic tire divided symmetrically along a mid-circumferential plane.

In FIG. 1 tubeless pneumatic earthmover tire 1 incorporates an inflatable radially inner component 2 and an inflatable radially outer component 3 detachably mounted upon the inner component.

The radially inner component 2 comprises two sidewalls 4 (only one of which is shown) and a crown in the form of an integral annular bridging portion 5. The inner component is provided with bead wires 6 and is reinforced by one steel cord layer 7, the cords of which extend around the component 2 across the bridging portion 5 and around the bead wires 6 in a plane at an angle of substantially 90° to the mid-circumferential plane of the tire.

A portion 8 of each sidewall extends radially outwardly beyond the bridging portion 5 and is formed of rubber. Each portion 8 is formed with a frusto-conical surface 9 on its surface for a purpose to be described.

The radially outer component 3 comprises a tread portion 10, shoulder portions 11, buttress portions 12 and a base portion 13. In the modification shown in FIG. 1, the base portion comprises two axially spaced apart portions, only one of which is shown, the axially inner edges 13a of the two portions being spaced apart axially; the outer component is thus open-bellied in form to permit access to its interior surface for repair when necessary. In the modification of FIG. 2 the base portion 13 extends from one side wall to the other. Each buttress portion 12 has a radially inner peripheral surface complementary to the frusto-conical surface 9 of the radially inner component.

The radially outer component is reinforced throughout by one layer 14 of steel cords which extend around the component at an angle of substantially 90° to the mid-circumferential plane of the tire, the ends of the cords terminating adjacent the axially inner edges 13a of the axially spaced apart portions of the base portion 13.

The base portion is rendered substantially inextensible in the circumferential direction by a second steel cord layer 15 located radially inwardly of the layer 14. The second layer extends from the axially inner edge 13a of each axially spaced apart portion to a position adjacent the axially inner edge of the frusto-conical surface of each buttress portion 12, and is formed in each of said spaced-apart portions from a single length of steel cord which is formed into a plurality of axially side by side convolutions with the steel cord extending substantially in a direction at 0° to the mid-circumferential plane.

Beneath the tread portion 10 of the radially outer component 3, the 90° steel cord layer 14 is superposed by a reinforcement 16 in the form of four breaker layers, each breaker layer comprising a plurality of parallel steel cords which extend in a direction at substantially 20° to the mid-circumferential plane, the cords in adjacent layers extending in opposite directions.

An inflation valve 17 located in one buttress portion 12 extends into the inflationary chamber 18 of the outer component. The inflation valve comprises a flexible rubber tube which is inserted through a hole provided in the rubber of the outer component before vulcanization thereof. In the finished condition of the outer component, the tube of the valve is normally held in a flattened condition by the pressure of the surrounding rubber so that the valve is in a closed air-tight condition. To inflate the outer component, it is necessary to insert a rigid narrow tube (not shown) through the valve tube, thereby opening the valve, the rigid tube extending into the inflationary chamber 18. The rigid tube is then connected to a source of air pressure to inflate the outer component and, after removal of the rigid tube, the inflation valve is once more in a sealed condition.

To assemble the tire above described upon a wheel rim, (not shown), the components of the tire are initially separate and the inflatable radially inner component 2 is mounted, in conventional manner, upon the rim and is located with its bead regions disposed between the bead retaining flanges of the rim. The radially outer component 3 is then seated around the annular bridging portion 5 of the inner component, the complementary frusto-conical surfaces of the inner and outer components providing means for locating the outer component axially with respect to the inner component. The inner component is then inflated so that the annular bridging portion 5 expands radially outwardly into air-tight engagement with the circumferentially inextensible axially-spaced-apart portions of the base portion 13 of the outer component to effectively seal the chamber within the outer component from atmosphere.

The outer component is then inflated to a pressure somewhat less than that within the inner component so that the outer component will not be so likely to be subject to detachment, should it become partially or wholly deflated, than would be the case if the outer component had the greater inflation pressure. In the former instance the pressure in the inner component will remain substantially constant whether the outer component is inflated, partially deflated or completely deflated.

In the modification of the embodiment shown in FIG. 2 the elements of the tire are the same and are identified with the same reference numerals except that the base portion 13 does not comprise two axially spaced apart portions, but extends from side-to-side of the outer component. In this modified construction, the substantially 0° layer of steel cords is formed from a single cord which extends in a plurality of convolutions from one side to the other of the base portion.

In another modification, the inflation valve provided in the outer component is replaced by a spring-controlled valve 19 extending through the annular bridging portion of the inner component. This valve is opened against the force of the spring when the air pressure within the chamber of the inner component exceeds a predetermined figure, during inflation of the inner component, to permit air under pressure to escape into the inflationary chamber of the outer component. The valve is designed so that it does not operate to inflate the outer component until the air pressure within the inner component is at such a value that the annular bridging portion has expanded radially outwardly sufficiently to form an effective air seal against the base portion, thereby preventing loss of air pressure and ensuring effective and quick inflation of the outer component.

In a further modification of the above described construction, the four steel breaker layers 16 are replaced by a plurality of pairs of layers of rubberized parallel textile cord material each pair of layers being formed from one circumferentially folded layer of material, the folds in the pairs of layers lying alternately on opposite sides of the breaker. The cords in each layer extend at substantially 20° to the mid-circumferential plane, the cords in adjacent layers extending in opposite directions.

In further modifications, the layer of steel cords extending at an angle of 90° and provided in either the inner or outer component, or in each component, is replaced either by a plurality of layers of rubberized parallel textile, e.g. rayon, cord material, the cords of which extend at substantilaly 90° to the mid-circumferential plane, or by a plurality of layers of rubberized parallel textile cord material the cords of which extend at an angle or angles of less than 90° to the said plane, the cords in adjacent layers extending in opposite direction to the said plane.

With a tire construction according to the invention, if the outer component sustains a puncture during use, it does not become loose upon, or become detached from, the inner component after deflation as it is firmly held in position by the grip imposed upon the base portion by the annular bridging portion of the inner component, and relative axial displacement of the components is prevented by the complementary frusto-conical surfaces.

Further, in the event of the outer component being punctured or otherwise needing replacement, retreading or repair after use of the tire, the outer component may be removed from the tire and a new one fitted without removal of the inner component from the wheel. This operation may, therefore, be performed in less time and with less effort than is required to replace a conventional tire of equal size.

A further advantage which is obtainable with tire constructions according to the invention in which an inflation valve is provided in the buttress portion of the outer component, is that during adverse road or ground conditions, i.e. when the road is ice or snow-bound, or the ground surface is muddy or composed of loose particulate material, a better road grip may be gained than with conventional tires of similar construction, by reducing the air pressure within the outer component thereby increasing the ground contacting area of the tread.

Having now described my invention, what I claim is:

1. A pneumatic tire incorporating two side walls and a tread portion and comprising a radially inner inflatable component and a detachable inflatable radially outer component, the radially inner component having side walls forming at least a part of each side wall of the tire and an annular bridging portion extending between and joining said side walls of the inner component, the side walls of the inner component extending radially outwardly beyond the bridging portion to form an annular circumferential channel, said outer component comprising the tread portion of the tire and a base portion fitting in the annular channel of the inner component and being substantially inextensible in a circumferential direction.

2. The pneumatic tire of claim 1 in which said annular circumferential channel has side walls inclined radially outwardly from the lower part of the channel.

3. The pneumatic tire of claim 1 having a valve in the bridging portion of said inner component spring pressed to closed position and opening from said inner component to said outer component.

4. A pneumatic tire incorporating two sidewalls and a tread portion and comprising an inflatable radially inner component and a detachable inflatable radially outer component, the radially inner component including at least a part of each sidewall of the tire and an annular bridging portion extending between and joined to said parts of the sidewalls, and the radially outer component including the tread portion of the tire and a base portion disposed radially inwardly of the tread portion, the base portion being substantially inextensible in a circumferential direction and being located about the annular bridging portion, said base portion comprising two axially spaced-apart portions, the axially inner edges of the two portions being spaced apart axially.

References Cited by the Examiner
UNITED STATES PATENTS

| | | | |
|---|---|---|---|
| 1,451,327 | 4/1923 | Cunningham | 152—188 |
| 1,989,402 | 1/1935 | Cupp | 152—187 |
| 1,991,594 | 2/1935 | Case | 152—330 |
| 2,984,282 | 5/1961 | Vittorelli | 152—361 |
| 2,985,214 | 5/1961 | Lugli | 152—176 |

ARTHUR L. LA POINT, *Primary Examiner.*

C. W. HAEFELE, *Assistant Examiner.*